US005580223A

United States Patent [19]

Bueser

[11] Patent Number: 5,580,223
[45] Date of Patent: Dec. 3, 1996

[54] FUEL INJECTION PUMP FOR INTERNAL COMBUSTION ENGINES

[75] Inventor: Wolfgang Bueser, Freiberg, Germany

[73] Assignee: Robert Bosch GmbH, Stuttgart, Germany

[21] Appl. No.: 383,275

[22] Filed: Feb. 3, 1995

[30]  Foreign Application Priority Data

Jun. 8, 1994 [DE]  Germany .......................... 44 19 992.9

[51]  Int. Cl.⁶ .............. F02M 41/14; F02D 1/16
[52]  U.S. Cl. ................... 417/219; 417/462; 123/450
[58]  Field of Search .................... 417/219, 221, 417/462; 123/450

[56]  References Cited

U.S. PATENT DOCUMENTS

| | | |
|---|---|---|
| 3,940,949 | 3/1976 | Ohki . |
| 4,032,260 | 6/1977 | Bosch ................................ 417/219 X |
| 4,037,574 | 7/1977 | Swift ................................. 417/219 X |
| 4,564,341 | 1/1986 | Tanaka ............................... 417/219 X |
| 4,710,106 | 12/1987 | Iwata et al. ......................... 417/219 X |

FOREIGN PATENT DOCUMENTS 0334364  9/1989  European Pat. Off. .
2117846  10/1983  United Kingdom .

*Primary Examiner*—Richard E. Gluck
*Attorney, Agent, or Firm*—Edwin E. Greigg; Ronald E. Greigg

[57]  ABSTRACT

A distributor fuel injection pump for internal combustion engines having at least one pump piston, which is guided in a cylinder bore and defines a pump work chamber therein and whose axial feed stroke motion is produced by a cam drive having at least one roller running on an annular cam race; at least one part of the cam drive is rotated to adjust the supply onset of the pump piston. This adjusting device is integrated into the housing which contains the cam drive by providing that the adjustable cam ring has radially protruding pressure vanes, each of which protrudes into a pressure chamber in the pump housing and divides this chamber into two pressure subchambers. Rotating the cam ring for the purpose of adjusting the supply onset of the pump piston over a wide angular range can now be effected by imposing pressure in alternation upon these pressure subchambers, which act in opposition upon the pressure vanes or the cam ring.

19 Claims, 3 Drawing Sheets

FUEL INJECTION PUMP FOR INTERNAL COMBUSTION ENGINES

BACKGROUND OF THE INVENTION

The invention is based on a fuel injection pump for internal combustion engines as set forth hereinafter. German patent disclosure DE-OS 31 42 715 discloses a fuel injection pump of this kind, in which a feed pump driven synchronously with the engine speed fills the suction chamber of a fuel injection pump with fuel, which is embodied as a distributor pump. This fuel in the suction chamber is under continuous pilot pressure, which depends upon the speed of the engine, and is employed there for adjusting the onset of injection of the fuel injection pump by being carried to an injection onset adjusting device. In the known fuel injection pump, this injection onset adjusting device is constituted by an injection adjusting piston which can move axially in a cylinder lining, one face end of the piston is acted upon by the pressure in the fuel suction chamber in such a way that upon increasing suction chamber pressure, the injection onset adjusting piston is axially moved against the force of a restoring spring.

This axial adjusting movement of the injection onset adjusting piston, which movement depends upon the suction chamber pressure or upon the speed of the engine, is converted into a rotary motion of a cam ring via a bolt, which protrudes radially from the injection onset adjusting piston and into a recess of the cam ring of the cam drive, which drives the fuel injection pump; the injection onset adjusting piston acts upon the cam ring so that upon increasing suction chamber pressure, i.e. upon increasing speed of the engine, it is rotated in the direction of an earlier supply onset.

However, the injection onset adjusting device of the known fuel injection pump has the disadvantage that the additional injection adjusting piston disposed on and guided in the pump housing requires a lot of space, which in modern fuel injection systems has a negative impact on the overall installation space required. Furthermore, due to the great number of elements required, the injection adjusting device of the known pump makes for cost-intensive production. A further disadvantage of the known injection adjusting device, moreover, is the limited adjusting range of approximately 15°–17° of the cam ring rotational angle, which is due not only to the window-like access to the cam ring, but also to the one-sided action of force upon the cam ring, which can lead to one-sided surface pressures along with the attendant disadvantages, so that the adjusting device of the known fuel injection pump no longer sufficiently fulfills the current requirements.

OBJECT AND SUMMARY OF THE INVENTION

The fuel injection pump according to the invention has an advantage over the prior art that by means of the disposition of the injection adjusting device inside the pump housing, without the costly injection adjusting piston, not only simplified manufacture can be obtained, but furthermore a considerable reduction in the installation space required can be attained. This is advantageously possible by means of the disposition of pressure vanes that protrude radially from the cam ring, each of which protrudes into a pressure chamber inside the pump housing and divides it into two pressure subchambers, which can be acted upon alternately with high pressure fuel. The adjusting movement of the cam ring at this point depends merely upon the circumferential extent of the pressure chambers and can therefore be embodied as much larger than in the adjusting devices known up until now. It is alternatively possible, as in the described exemplary embodiment, to dispose the pressure vanes protruding radially from the adjustable part of the cam drive into a pressure chamber (e.g. in radial piston pumps), or conversely also protruding axially from the adjustable part of the cam drive into a pressure chamber (e.g. in axial piston pumps).

In order to be able to forgo a spring-loaded restoring movement of the cam ring, the injection onset adjusting device is positively controlled, while the supply of pressurized fluid (preferably fuel) into both pressure subchambers of the pressure chambers is controlled by means of a control device. The control device is preferably embodied in a structurally simple manner as a 2-way slide valve, which controls the supply of pressurized fuel into the pressure subchambers, which act in opposition upon the pressure vanes, in such a way that the one supply line is closed by exactly the same measure as the other pressure line is opened.

In order to enable a secure contact of the ends of the pressure vanes that radially protrude from the cam ring against the wall of the pressure chamber, and at the same time to create an opportunity of relieving the pressure chamber, the pressure vanes are acted upon by pressure springs in the direction of the pressure chamber; these springs can be embodied as spiral, leaf, or other kinds of springs. In their interior, the pressure vanes advantageously have a relief bore connecting the axial ends, via which bore the pressure chambers can be pressure-relieved into a spring chamber containing the pressure springs and can be further pressure-relieved via a relief line, down to a certain standing pressure. Besides a secure contact of the pressure vanes against the pressure chamber wall, making the ends of the pressure vanes oriented toward the chamber wall concave also produces a throttled outflow of the pressure medium into the relief bore.

The embodiment of the injection adjusting device according to the invention, particularly for distributor-type fuel injection pumps, is provided with an adjustable cam ring for adjusting the supply onset; hence these fuel injection pumps may be embodied equally well as either radial piston pumps or axial piston pumps.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
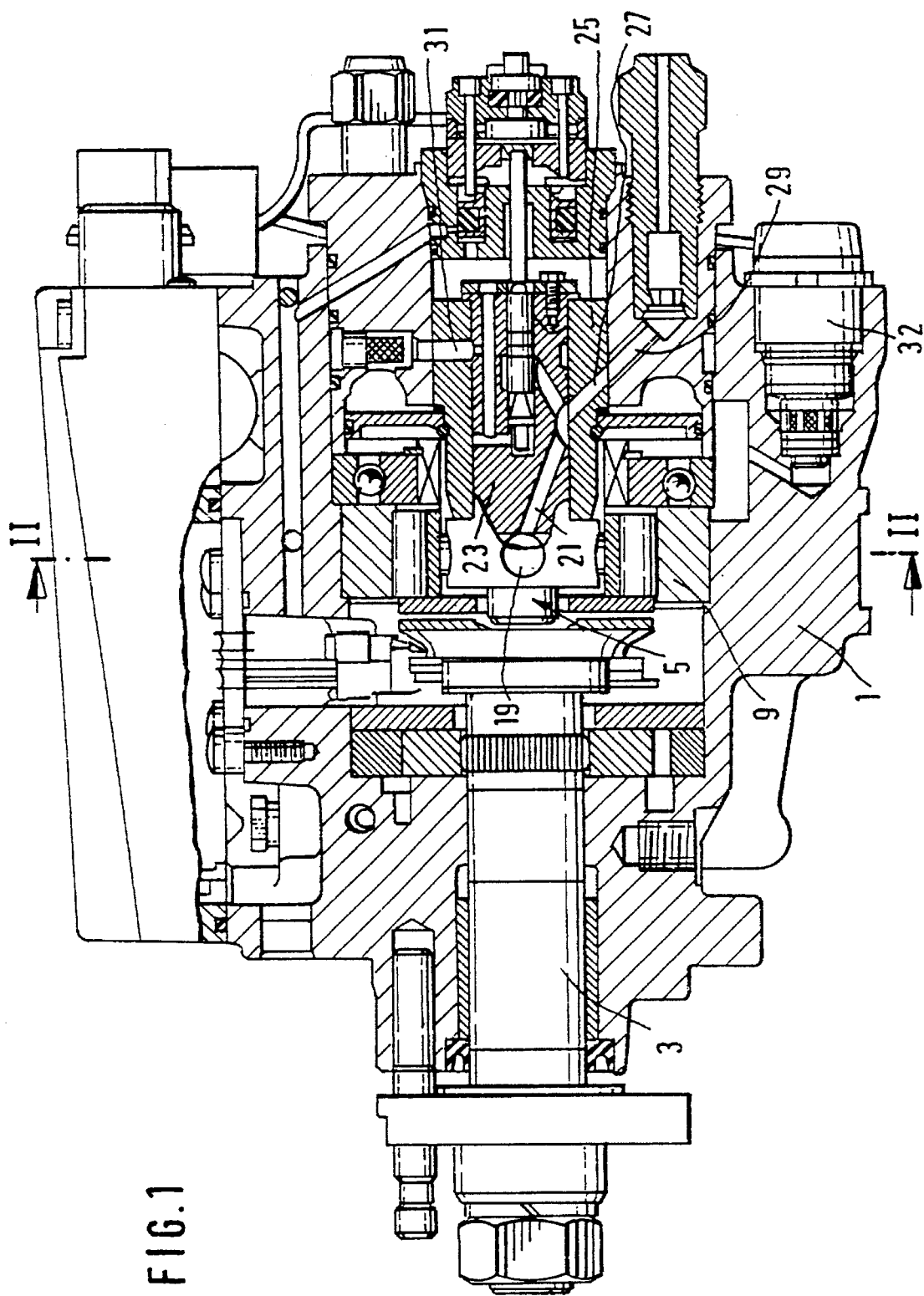
FIG. 1 shows a section through a distributor fuel injection pump of the radial piston type, from which the location of the cam drive in particular can be inferred.
Figure 2:
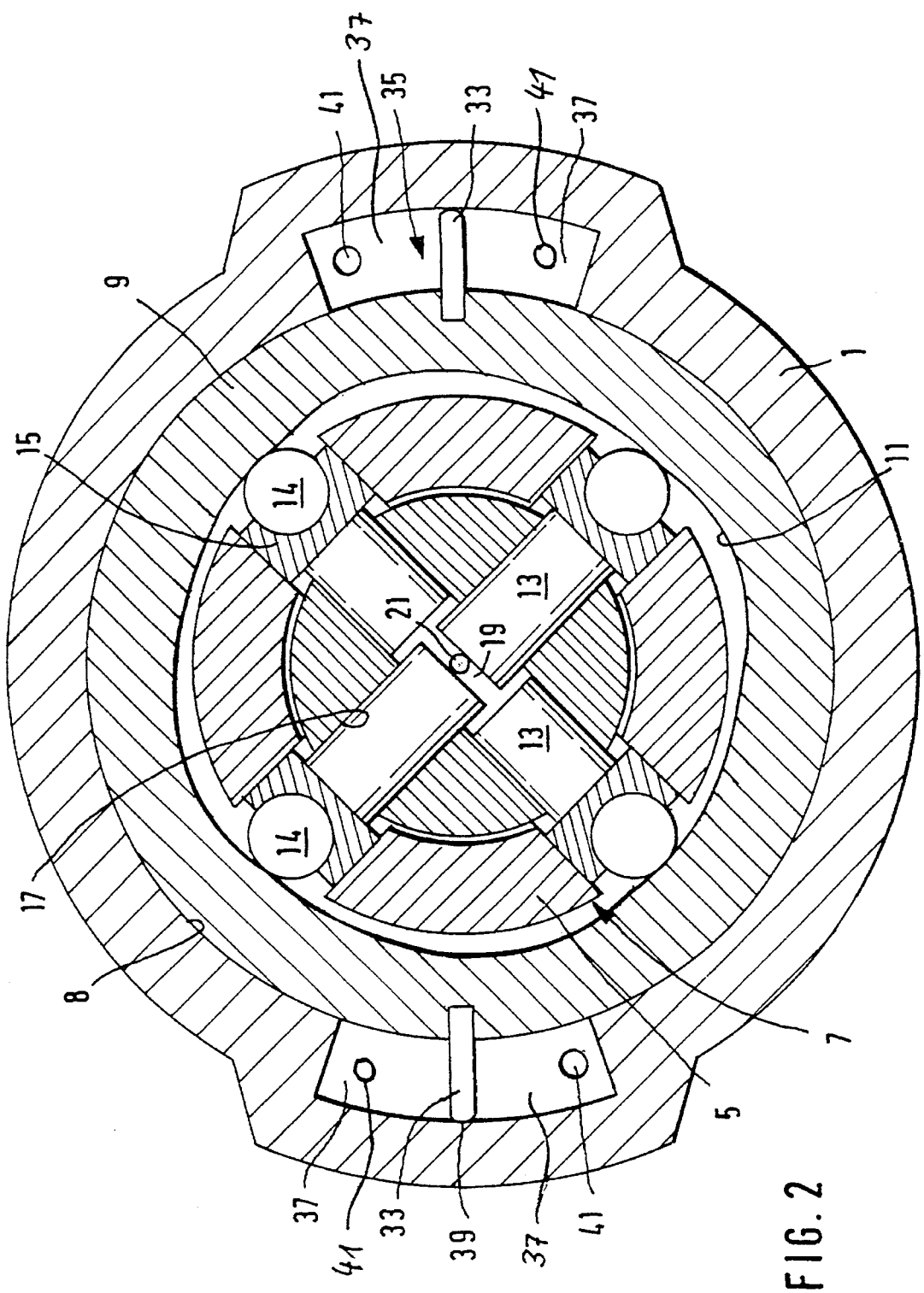
FIG. 2 shows a section through the cam drive of FIG. 1, showing the injection onset adjusting device acting upon the cam ring.

In the distributor fuel injection pump for internal combustion engines of the type made known by German patent disclosure DE-OS 31 42 715, which is shown in FIG. 1 and of which only the parts essential to the invention are described, a drive shaft 3, which is supported in the housing 1 of the fuel injection pump and revolves synchronously with the engine speed, drives a rotor 5 to rotate a cam drive 7. The cam drive 7, shown enlarged in FIG. 2, is embodied by a cam ring 9 disposed in stationary fashion in the axial direction of the drive shaft 3 and supported in a circular recess 8 of the pump housing 1; on its radially inwardly oriented inner face, the cam ring 9 has a cam race 11 upon which four pump pistons 13, disposed in a radial plane of the disk shaped rotor 5, each run by means of a roller tappet 15, which has a roller 14, during the rotary motion of the rotor 5. The paired pump pistons 13 are guided axially, one pair in each cylinder bore 17; the two cylinder bores 17 intersect one another on the axis of the rotor 5. The pump pistons 13, with their face ends remote from the roller tappets 15, define a common pump work chamber 19, which extends particularly over the region of intersection of the cylinder bores 17 and from which a connecting conduit 21 leads to a distributor 23 nonrotatably connected to the rotor 5 (preferably embodied as one piece with it) and which exits there from its circumferential face. This cylinder-shaped distributor 23 is axially guided in a cylinder sleeve 25 immovably fixed to the pump housing 1, in which sleeve 25 a multitude of connecting bores 27 are provided, which correspond to the number of injection points and whose exit openings are disposed on the inner wall, which guides the distributor 23, in a common radial plane at the level of the exit opening of the connecting conduit 21 and which are adjoined by the individual high pressure lines 29 to the injection points. Furthermore, in the radial plane of the exit openings of the connecting bores 27, the cylinder sleeve 25 has a mouth of an inlet bore 31, which can communicate on the other end with the fuel-filled interior of the fuel injection pump, whose fuel pressure can be adjusted via an overpressure valve 32 which connects the pump interior with a relief line.

Figure 3:
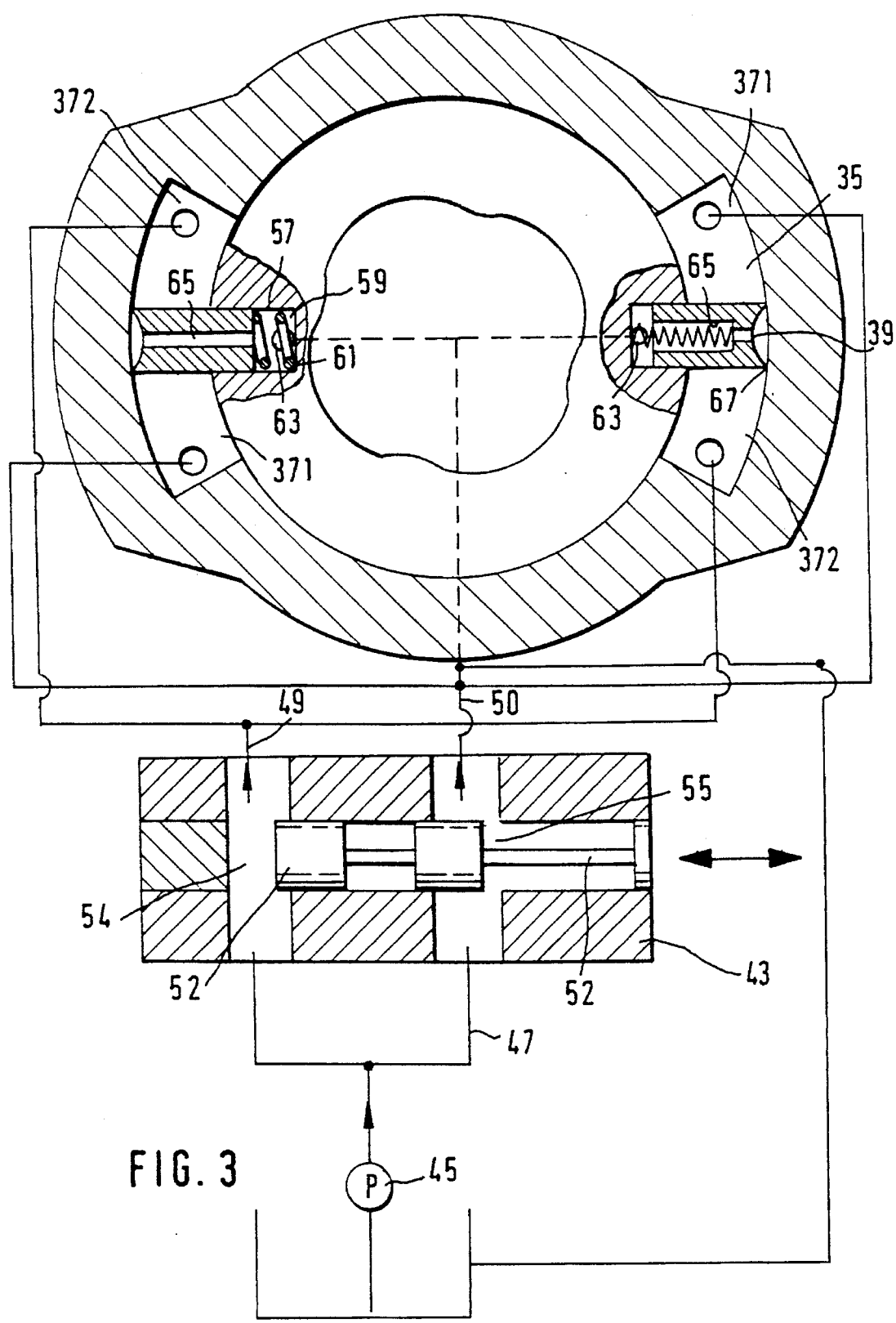
FIG. 3 shows a schematic representation of the control of the injection onset adjusting device on the cam ring.

To adjust the beginning of the radially inwardly oriented feed stroke movement of the pump piston 13, the cam ring 9 is supported so that it can rotate in the circumferential direction in the pump housing 1. As shown in FIG. 2, two pressure vanes 33, embodied geometrically identically to each other, preferably in the form of rectangular struts, are disposed on the cam ring 9, protruding radially from it on opposite sides; these vanes protrude into the pressure chambers 35, which are embodied in the pump housing 1, in such a way that the vanes divide them into two separate pressure subchambers 37. The wall of the pressure chamber 35 remote from the cam ring 9 is embodied as arc-shaped so that the radially outward-pointing ends or face ends 39 of the pressure vanes 33 can be securely held in contact with it over the entire adjusting range of the cam ring 9. The jacket face of the cam ring 9 closes off the pressure subchambers 37 at the pump housing 1. Pressure lines 41 lead away from the individual pressure subchambers 37 and as shown in FIG. 3 can communicate with a pressure reservoir, preferably of a fuel feed pump 45, by a control valve 43 disposed between them. In the exemplary embodiment described, the control valve 43 is embodied as a 2-way valve, with two parallel fuel supply lines 47, leading from the feed pump 45, and two collecting lines 49, 50, which can each communicate with them via a respective flow cross section 54, 55 inside the control valve 43; the two pressure lines 41, each originating at the particular pressure subchamber 37 that acts in the same rotational direction upon the pressure vanes 33, discharge together into each of the collecting lines 49, 50. Thus in FIG. 3, the collecting line 50 supplies the pressure subchambers 371 that act in the clockwise direction upon the pressure vanes 33 or the cam ring 9, and the collecting line 49 supplies the pressure subchambers 372 that act in the opposite direction upon the cam ring 9. The rotation of the cam ring 9 is positively controlled, while a piston-shaped valve member 52, which protrudes into the flow cross sections 54, 55, can be adjusted in such a way that upon the closing of the flow cross section 54 between the supply line 47 and the collecting line 49 by a certain amount, the flow cross section 55 between the supply line 47 and the collecting line 50 is opened by the same extent.

This positive control is necessary, particularly in direct-injection pumps, since in such pumps, very strong restoring forces act upon the cam ring 9. On the other hand, in pumps which inject indirectly, it is alternatively sufficient to carry out the control via a throttled removal of leakage away from one of the pressure subchambers 371 or 372.

For a pressure relief of the pressure chamber 35, a spring chamber 59 is formed between the face ends of the pressure vanes 33 oriented toward the cam ring and a radial receiving opening 57 in the cam ring 9, which opening guides the axially movable pressure vanes 33; each spring chamber 59 contains a pressure spring 61 fastened between the cam ring 9 and the pressure vanes 33, and can be pressure-relieved via a relief conduit 63 into the pump interior or the pump suction chamber. This spring chamber 59 can communicate via a through bore 65 in the pressure vanes 33 with the vane face end 39 remote from the cam ring, which face end is embodied as concave in cross section; the sealing edges 67 formed thus, which cooperate with the wall of the pressure chamber 35, form a throttle location upon lifting of the pressure vanes 33 from the pressure chamber wall so that besides enabling a good guidance of the pressure vanes 33 on the pressure chamber wall, the concave form of the face ends 39 also makes possible a throttled pressure relief of the pressure chamber 35, which is furthermore also effected via the leakage quantity at the spacing remaining between the cam ring 9 and the pump housing 1.

If there are continuous, relatively large leakage quantities from the pressure subchambers 371, 372, therefore resulting in a continuous feeding of fuel into these pressure subchambers, then this can alternatively also be effected via two separate, technically less costly cadencing valves.

The fuel injection pump according to the invention functions as follows.

The rotor 5 is set into a rotary motion by the rotary drive motion of the drive shaft 3, as a consequence of which the pump pistons 13 disposed in the rotor 5 are set into a reciprocating feed motion in a known manner by means of the roller tappets 15 running on the fixed cam race 11; the fuel supplied from the pump work chamber 19 under high fuel pressure is supplied to the individual high pressure lines via the rotating distributor 23.

If an adjustment of the supply onset in the earlier or later direction should now take place, the pressure subchambers 371 or 372 are supplied with a fixed fuel volume flow by means of opening or closing of the corresponding flow cross sections 54, 55, in which the fuel volume flow, being of various magnitudes, introduce different pressures into the pressure subchambers 371, 372 so that an adjustment of the cam ring 9 can take place. For a fixed supply onset, the fuel volume flows are correspondingly triggered so that the pressure difference between the individual pressure subchambers plus the torque of the cam ring results in an equilibrium.

The pressure relief of the pressure chamber 35 takes place at the pressure vanes 33 via the relief conduit 63; which is connected via a line 70 with a low pressure suction chamber 72; the fuel pressure inside the pump housing 1 is maintained at a low pressure compared to the feed pressure of the feed pump 45 by the overpressure valve 32 in order to thus guarantee the pressure difference necessary for the pressure relief. The pressure relief of the pressure subchamber, which is closed with respect to the feed pump 45, is additionally effected via the leakage flow between cam ring 9 and pump housing 1. For faster and more reliable pressure relief of the closed pressure subchambers 37, it is alternatively possible to provide a bypass line to a relief chamber, directly at the control valve 43, which can even more considerably improve the control of the supply onset, which in addition to a purely pressure-dependent control can also take place electrically, depending upon the parameters of the engine.

The basic position of the cam drive 7 in the direction of later supply onset, which position is necessary for the start of the engine to be fed, is effected by means of the complete closing of the pressure lines 41 to the pressure subchambers 37 that act upon the pressure vanes 33 or the cam ring 9 in the direction of earlier supply onset, so that these subchambers are relieved down to the residual pressure remaining inside the pump housing 1. On the other hand, the pressure subchambers 37 that act in the direction of later supply onset continue to be acted upon by the standing pressure in the supply line 47 of the feed pump 45, which is higher than the internal pump pressure, so that initially the cam ring 9 is securely held in the direction of later supply onset. In the event of a pressure equilibrium between the pressure subchambers 37 or the entire fuel system, as a consequence of a relatively long non-use phase, the late supply onset is assured before starting of the engine by means of the pilot feed pressure built up first in the fuel supply line 47, so that when the engine is started, the supply onset adjustment toward late can be guaranteed even without an additional restoring spring.

With the fuel injection pump according to the invention, it is consequently possible in a structurally simple manner to integrate the injection onset adjusting device into the pump housing and furthermore to make possible a greater adjusting range of the cam ring. The adjusting device can be adapted to the distributor fuel injection pumps of both the radial piston type as well as the axial piston type; the pressure vanes can protrude alternatively radially or axially from the rotatable part of the cam drive for the adjustment of the injection onset.

The foregoing relates to a preferred exemplary embodiment of the invention, it being understood that other variants and embodiments thereof are possible within the spirit and scope of the invention, the latter being defined by the appended claims.

What is claimed and desired to be secured by Letters patent of the U.S. is:

1. A fuel injection pump for internal combustion engines having at least one pump piston (13), which is axially guided in a cylinder bore (17) of a pump housing, said cylinder bore defines a pump work chamber (19) therein, a pump piston axial feed stroke motion is produced by a cam drive (7) comprising a rotor with at least one roller (14) that runs on an annular cam race (11) of a cam ring (9), which carries the cam race (11), said rotor is driven to rotate by a fuel injection pump drive and the cam ring is supported in annular fashion in a circular recess (8) of the pump housing (1) and is rotated with regard to the pump housing in a circumferential direction of the cam ring by means of an adjusting device for changing an injection onset, the adjusting device for changing the injection onset is integrated into a part of the pump housing (1) which contains the cam ring, the adjusting device comprises at least two pressure vanes (33), which protrude from the cam ring (9) of the cam drive (7) perpendicular to a direction of rotation, said pressure vanes are coupled to said cam ring (9) of the cam drive (7) in a direction of rotation, each of said pressure vanes protrude into one pressure chamber (35) inside the pump housing (1), which pressure chamber adjoins the cam ring (9) of the cam drive (7) and is closed off by the cam ring, such that the pressure vanes (33) divide these pressure chambers (35) into a first pressure subchamber (371) and a second pressure chamber (372), and one pressure line (41) leads from each of the pressure subchambers, said first and second pressure chambers having corresponding positions relative to said pressure vanes.

2. The fuel injection pump according to claim 1, in which the pressure vanes (33) have identical geometric measurements and are disposed on directly opposite sides of the cam ring (9) from each other.

3. The fuel injection pump according to claim 1, in which the first and second pressure subchambers of the pressure chambers (35) are alternatingly acted upon via the pressure lines (41) by pressure from a pressure reservoir, and each of said first and second pressure subchambers (371, 372) act upon the pressure vanes (33) in the same rotational direction of the cam ring (9) and each of said first pressure subchambers is filled with the same pressure, and each of said second pressure subchambers is filled with the same pressure which pressure may differ from the pressure in said first pressure subchambers.

4. The fuel injection pump according to claim 2, in which the first and second pressure subchambers of the pressure chambers (35) are alternatingly acted upon via the pressure lines (41) by pressure from a pressure reservoir, and each of said first and second pressure subchambers act upon the pressure vanes (33) in the same rotational direction of the cam ring (9) and each of said first pressure subchambers is filled with the same pressure, and each of said second pressure subchambers is filled with the same pressure which pressure may differ from the pressure in said first pressure subchambers.

5. The fuel injection pump according to claim 3, in which the supply of pressurized fluid into the first and second pressure subchambers is controlled by means of a control valve (43) embodied as a 2-way valve, said 2-way valve controls the supply of pressurized fluid from the pressure reservoir into the pressure lines (41), and the pressure lines (41) of the first and second pressure subchambers respectively act upon the pressure vanes (33) in the same rotation direction and each feed into a common collecting line (49, 50) at the control valve (43).

6. The fuel injection pump according to claim 4, in which the supply of pressurized fluid into the first and second pressure subchambers is controlled by means of a control valve (43) embodied as a 2-way valve, said 2-way valve controls the supply of pressurized fluid from the pressure reservoir into the pressure lines (41), and the pressure lines (41) of the first and second pressure subchambers respectively act upon the pressure vanes (33) in the same rotation direction and each feed into a common collecting line (49, 50) at the control valve (43).

7. The fuel injection pump according to claim 1, in which the pressure vanes (33) protrude radially from an outer circumference of the cam ring (9) of the cam drive (7) and dip into a partially annular pressure chamber (35) that adjoins the circumference of the cam ring (9).

8. The fuel injection pump according to claim 5, in which the pressure vanes (33) protrude radially from an outer circumference of the cam ring (9) of the cam drive (7) and dip into a partially annular pressure chamber (35) that adjoins the circumference of the cam ring (9).

9. The fuel injection pump according to claim 2, in which the pressure vanes (33) protrude radially from an outer circumference of the cam ring (9) of the cam drive (7) and dip into a partially annular pressure chamber (35) that adjoins the circumference of the cam ring (9).

10. The fuel injection pump according to claim 3, in which the pressure vanes (33) protrude radially from an outer circumference of the cam ring (9) of the cam drive (7) and dip into a partially annular pressure chamber (35) that adjoins the circumference of the cam ring (9).

11. The fuel injection pump according to claim 5, in which the pressure vanes (33) protrude radially from an outer circumference of the cam ring (9) of the cam drive (7) and dip into a partially annular pressure chamber (35) that adjoins the circumference of the cam ring (9).

12. The fuel injection pump according to claim 7, in which the pressure vanes (33) protrude radially from an outer circumference of the cam ring (9) of the cam drive (7) and dip into a partially annular pressure chamber (35) that adjoins the circumference of the cam ring (9).

13. The fuel injection pump according to claim 5, in which the 2-way valve (43) is embodied as a slide valve, which has a piston-shaped valve member (52), said valve member (52) protrudes into two flow cross sections (54, 55) between the common collecting lines (49, 50) and a fuel supply line (47) to the pressure reservoir in such a way that upon opening of the one flow cross section (54) by a certain amount, the valve member closes the other flow cross section (55) by the same amount and vice versa.

14. The fuel injection pump according to claim 13, in which the fuel brought to a certain pilot pressure by a fuel feed pump (45) is employed as pressure fluid.

15. The fuel injection pump according to claim 1, in which the pressure vanes (33) are inserted into radially oriented receiving openings (57) on the cam ring (9) so they can move axially, and pressure springs (61) are fastened between the cam ring (9) and pressure vane (33) and act upon the pressure vanes (33) in the direction of contact with the wall of the pressure chamber (35).

16. The fule injection pump according to claim 15. in which the face ends (39) of the pressure vanes (33) remote from the cam ring (9) are embodied as concave and form sealing edges (67) with their outer edges which sealingly contact the pressure chamber wall.

17. The fuel injection pump according to claim 16, in which the face ends of the pressure vanes (33), which ends are oriented radially to the cam ring (9), can hydraulically communicate with each other by means of an axial through bore (65) and a relief conduit (63).

18. The fuel injection pump according to claim 17, in which the spring chamber (59), which contains the pressure spring (61) between pressure vane (33) and the cam ring (9), communicates via a relief conduit (63) with a low pressure suction chamber of the fuel injection pump.

19. The fuel injection pump according to claim 1, in which four pump pistons (13) defining a common pump work chamber (19) are provided, whose axes are disposed in a common radial plane of a disk-shaped cam drive (7) and which are driven to reciprocate while running on the radially inward-pointing cam race (11).

* * * * *